June 6, 1933.

H. J. LOWE

PRINTER'S ROLLER

Re. 18,857

Original Filed April 4, 1931

Inventor

H. J. Lowe

By C. A. Snow & Co.

Attorneys.

Reissued June 6, 1933 Re. 18,857

UNITED STATES PATENT OFFICE

HERBERT J. LOWE, OF GALESBURG, ILLINOIS

PRINTER'S ROLLER

Original No. 1,890,858, dated December 13, 1932, Serial No. 527,807, filed April 4, 1931. Application for reissue filed February 11, 1933. Serial No. 656,389.

This invention relates to a printer's roller for use as an intermediate, distributor or vibrator roller the function of which is to spread the ink into a thin film prior to its application to the form, and also as a form or feeder roller. Heretofore rollers for these purposes have generally been made of composition or rubber but these have been objectionable because they have not kept their form but would swell or shrink due to atmospheric changes or oil saturation.

It is an object of the present invention to provide a simple form of roller which can be produced readily and has none of the disadvantages herein enumerated.

It is also an object to provide a roller capable of running at a high speed and for a long period without getting out of shape or deteriorating.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing, the preferred form of the invention has been shown.

Figure 1:
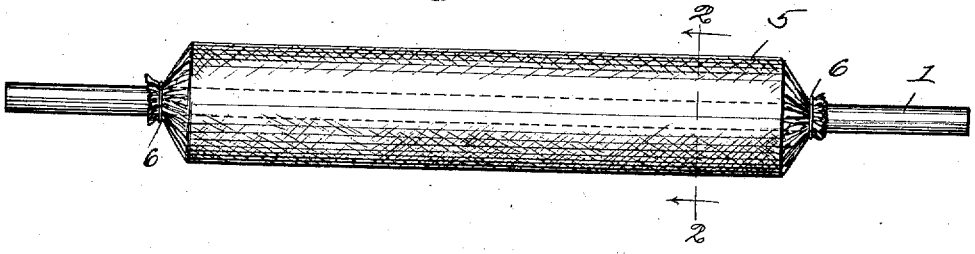
Figure 1 is an elevation of the roller.
Figure 2:
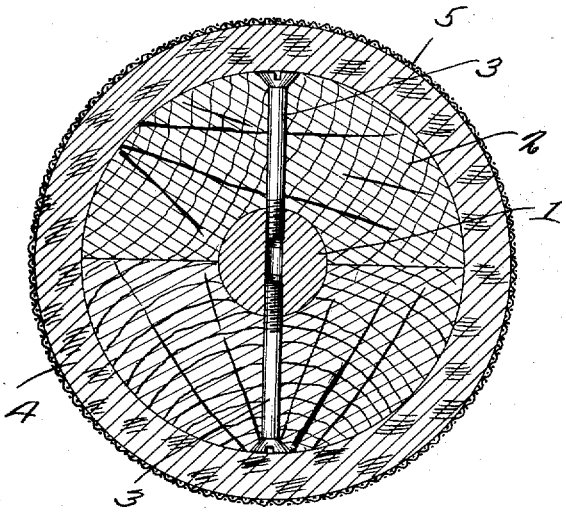
Figure 2 is an enlarged section on line 2—2, Figure 1.
Figure 3:
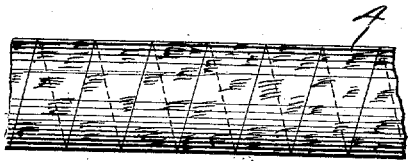
Figure 3 is an elevation of a portion of the roller with its outer covering removed.

Referring to the figures by characters of reference, 1 designates the usual metal core or stock. Mounted on this core is a split cylinder 2 formed preferably of soft wood. The parts of this cylinder are held together by glue and can also be glued to the core. As a further means of fastening, screws 3 can be extended through the sections of the split cylinder into the core, the heads of these screws being flush or substantially flush with the surface of the finished cylinder.

After the sections of the cylinder have been assembled it is designed to be turned down in a lathe to the desired diameter. Thereafter strips of cork are wrapped spirally around the cylinder 2 as shown at 4, being held thereto with glue or shellac. Small nails can be employed for holding the cork in place until the binder has hardened. They can subsequently be removed. The exposed surface of the cork layer can subsequently be dressed down so that a smooth surface will be obtained and following this operation, an outer covering 5 of fabric such as canvas or muslin is pasted onto the cork. It is preferred to form this outer covering in a seamless tube which can be stretched over the cork and the adhesive thereon and then tied at the ends as shown at 6.

It has been found in practice that a roller such as herein described will not soften or become otherwise distorted when operated at a high speed but will keep its shape under all conditions. It will provide any necessary resiliency and is particularly advantageous because of the ease with which it can be refinished when desired.

Obviously instead of using a seamless tubular outer covering, a sheet of fabric can be wrapped one or more times about the structure and held by an adhesive.

What is claimed is:

1. A roller of the class described including a one-piece solid core, a split wooden cylinder surrounding and secured to the core, strips of cork wrapped spirally about and affixed to the cylinder, and an outer covering of fabric affixed to the cork.

2. A roller of the class described including a one-piece solid core, a split wooden cylinder surrounding the core, strips of cork wrapped spirally about and affixed to the cylinder, an outer covering of fabric affixed to the cork, and means extending through the sections of the cylinder and into the core for holding the core and cylinder sections assembled, said cork wrapping being extended across the outer ends of the holding means to provide a covering and retainer therefor.

3. A roller of the class described including a one-piece solid core, a wooden cylinder divided longitudinally into contacting sections surrounding the core, a layer of cork extending around and affixed to the cylinder, and metal fastening means extending through the sections of the cylinder into the core for holding the core and cylinder sections assembled, the layer of cork being extended across the outer ends of the holding means to provide a covering and retainer therefor.

HERBERT J. LOWE.